United States Patent
Abdul Gaffar et al.

(10) Patent No.: US 10,956,975 B1
(45) Date of Patent: Mar. 23, 2021

(54) PURCHASE ASSISTANCE BASED ON DEVICE MOVEMENT

(71) Applicant: Wells Fargo Bank, N.A., San Francisco, CA (US)

(72) Inventors: Abdul Razack Abdul Gaffar, Cuddalore (IN); Shanmukeswara Rao Donkada, Hyderabad (IN); Parul Ghosh, Bangalore (IN)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 16/555,738

(22) Filed: Aug. 29, 2019

Related U.S. Application Data (60) Provisional application No. 62/735,536, filed on Sep. 24, 2018.

(51) Int. Cl.
  *G06Q 40/02* (2012.01)
  *G06F 1/16* (2006.01)
  *H04W 4/02* (2018.01)
  *G06T 19/00* (2011.01)

(52) U.S. Cl.
  CPC ......... *G06Q 40/025* (2013.01); *G06F 1/1694* (2013.01); *G06T 19/006* (2013.01); *H04W 4/026* (2013.01)

(58) Field of Classification Search
  CPC ............ G06Q 40/025; G06Q 30/0623; G06Q 30/0633; G06Q 30/0273; G06F 1/1694; G06T 19/006; H04W 4/026
  See application file for complete search history.

(56) References Cited

U.S. PATENT DOCUMENTS

| | | | |
|---|---|---|---|
| 6,535,132 B2 | 3/2003 | Waters et al. | |
| 7,756,525 B1 | 7/2010 | Thomas et al. | |
| 7,819,315 B1* | 10/2010 | Pienkos | G06Q 30/02 235/383 |
| 8,639,440 B2* | 1/2014 | Nicholson | G06T 19/006 701/410 |
| 8,639,621 B1 | 1/2014 | Ellis et al. | |
| 8,799,102 B2 | 8/2014 | Jaramillo | |
| 9,070,094 B2* | 6/2015 | Goulart | G06Q 30/0633 |
| 9,195,994 B1 | 11/2015 | Ellis et al. | |
| 9,294,620 B2 | 3/2016 | Fugman et al. | |
| 9,298,831 B1* | 3/2016 | Heldt | G06F 16/287 |
| 9,307,378 B2 | 4/2016 | Johansson | |

(Continued)

*Primary Examiner* — Namrata Boveja
*Assistant Examiner* — Pierre L Maccagno
(74) *Attorney, Agent, or Firm* — Walter Haverfield LLP; James J. Pingor (57) ABSTRACT

Purchase assistance is provided to a user based on user device location and direction. Input to a user device, identifying a product or service of interest, can be received. Next, a location of the user device is determined, and one or more providers of the product or service are identified in proximity to the location of the user device. Direction information of the user device is determined by ascertaining a compass orientation of the user device or a direction vector of movement of the user device. Subsequently, providers are identified based on the direction information and presented to a user on a display of the user device. Further, an offer associated with the product or service, such as a finance offer, can be generated and presented with the providers on the display.

16 Claims, 7 Drawing Sheets

(56) References Cited

U.S. PATENT DOCUMENTS

| | | |
|---|---|---|
| 9,402,163 B2 | 7/2016 | Edge |
| 9,451,403 B2 | 9/2016 | Lyman et al. |
| 9,678,651 B2 | 6/2017 | Moha et al. |
| 9,747,627 B2 | 8/2017 | Wright |
| 9,824,384 B2* | 11/2017 | Li .................... G06Q 30/0639 |
| 9,934,523 B1 | 4/2018 | Brock |
| 10,242,383 B2* | 3/2019 | Sasankan ........... G06Q 30/0259 |
| 2001/0031640 A1 | 10/2001 | Waller et al. |
| 2003/0004743 A1 | 1/2003 | Callegari |
| 2006/0143080 A1 | 6/2006 | Garg et al. |
| 2009/0012704 A1* | 1/2009 | Franco .................. G01Q 21/20 |
| | | 701/532 |
| 2011/0258049 A1* | 10/2011 | Ramer .............. G06Q 30/0273 |
| | | 705/14.66 |
| 2012/0016678 A1* | 1/2012 | Gruber .............. H04M 1/72547 |
| | | 704/275 |
| 2012/0036014 A1 | 2/2012 | Sunkada |
| 2013/0073376 A1* | 3/2013 | Heath .................... G06Q 30/02 |
| | | 705/14.39 |
| 2013/0073377 A1* | 3/2013 | Heath .................... G06Q 30/02 |
| | | 705/14.39 |
| 2013/0073388 A1* | 3/2013 | Heath .................... G06Q 30/02 |
| | | 705/14.53 |
| 2013/0080578 A1* | 3/2013 | Murad ............. H04N 21/25891 |
| | | 709/217 |
| 2013/0268357 A1* | 10/2013 | Heath .................... G06Q 30/02 |
| | | 705/14.53 |
| 2013/0275164 A1* | 10/2013 | Gruber .................... G10L 17/22 |
| | | 705/5 |
| 2013/0275899 A1* | 10/2013 | Schubert ............... G06F 3/0481 |
| | | 715/765 |
| 2013/0290172 A1* | 10/2013 | Mashinsky .......... G06Q 20/384 |
| | | 705/39 |
| 2013/0317916 A1 | 11/2013 | Gopalakrishnan et al. |
| 2014/0006129 A1* | 1/2014 | Heath ................ G06Q 30/0222 |
| | | 705/14.23 |
| 2014/0040748 A1* | 2/2014 | Lemay ................ G10L 15/1822 |
| | | 715/728 |
| 2014/0289047 A1 | 9/2014 | Yee et al. |
| 2015/0058124 A1 | 2/2015 | Sethi |
| 2015/0100405 A1 | 4/2015 | Lee |
| 2015/0317717 A1* | 11/2015 | Olebe ................ G06Q 30/0601 |
| | | 705/14.54 |
| 2016/0148305 A1 | 5/2016 | Gonzales |
| 2017/0076356 A1 | 3/2017 | Agrawal et al. |
| 2017/0193506 A1* | 7/2017 | Karnati ............. G06Q 20/3224 |
| 2017/0249693 A1* | 8/2017 | Greenwood ............ G06T 15/00 |
| 2017/0286986 A1* | 10/2017 | Dey .................... G06Q 30/0633 |
| 2018/0020319 A1 | 1/2018 | Kim et al. |
| 2018/0060909 A1 | 3/2018 | Adams et al. |
| 2018/0089748 A1* | 3/2018 | Chaudhuri ......... G06Q 30/0641 |
| 2019/0005569 A1* | 1/2019 | Kotha ................... G06F 16/909 |
| 2019/0035043 A1* | 1/2019 | Jones .................... G06Q 50/28 |

\* cited by examiner

PURCHASE ASSISTANCE BASED ON DEVICE MOVEMENT

CROSS-REFERENCE TO RELATED APPLICATION

This application claims the benefit of U.S. Provisional Patent Application No. 62/735,536, filed Sep. 24, 2018, and entitled "DEVICE MOVEMENT BASED OFFERS," the entirety of which is incorporated herein by reference.

BACKGROUND

Consumers often attempt to acquire the best deal for products and services they are interested in purchasing. In furtherance of this goal, consumers may need to make multiple trips to different stores to comparison shop. Additionally, or alternatively, customers may visit multiple websites searching for the product or service on each site and noting the cost.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

Briefly described, the subject disclosure pertains to purchase assistance based on device movement. A user utilizing a user device can identify a product or service of interest. After receipt of the identity of the product or service, providers of such a product or service, such as stores, are determined and presented to the user on a display of the user device. Moreover, direction, as well as location, associated with the user device can be taken into account in determining and presenting providers, wherein direction corresponds to a course along which a user device is moving or is aimed, for instance. Further, offers associated with a product or service can be identified and presented in conjunction with providers. In one instance, the offer can correspond to a financial offer generated based on a financial profile of a user as well as a relationship between a financial institution and a provider. Further, an augmented reality view can be provided that overlays providers and offers onto a camera view and dynamically updates based on changes in directional aiming of a user device.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Locating the best deal for a particular product or service can be an onerous process. For instance, an individual may need to make trips to multiple stores or search numerous e-commerce websites for price comparisons. For a high-cost item, the process can include not only finding a provider with the best price but also one with desirable finance options.

The subject disclosure generally pertains to purchase assistance based on device movement. After input of requirements for a particular product or service, providers, such as stores, that offer a corresponding product or service for sale can be determined. Further, the providers can be filtered based on location and direction a user device (e.g. smart phone, tablet . . . ) is moving or facing. The providers can then be presented on a display of the user device. In addition to providers, promotions or offers associated with a product or service can be presented to a user including discounts and finance options, among other things. Further, input from social media platforms or other sources can be acquired and provided, such as reviews of a provider or particular product. In accordance with one embodiment, augmented reality technology can be employed to superimpose identified providers, offers, and reviews over a real-world image thereby providing a composite view that changes based on the direction a user device is aimed.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
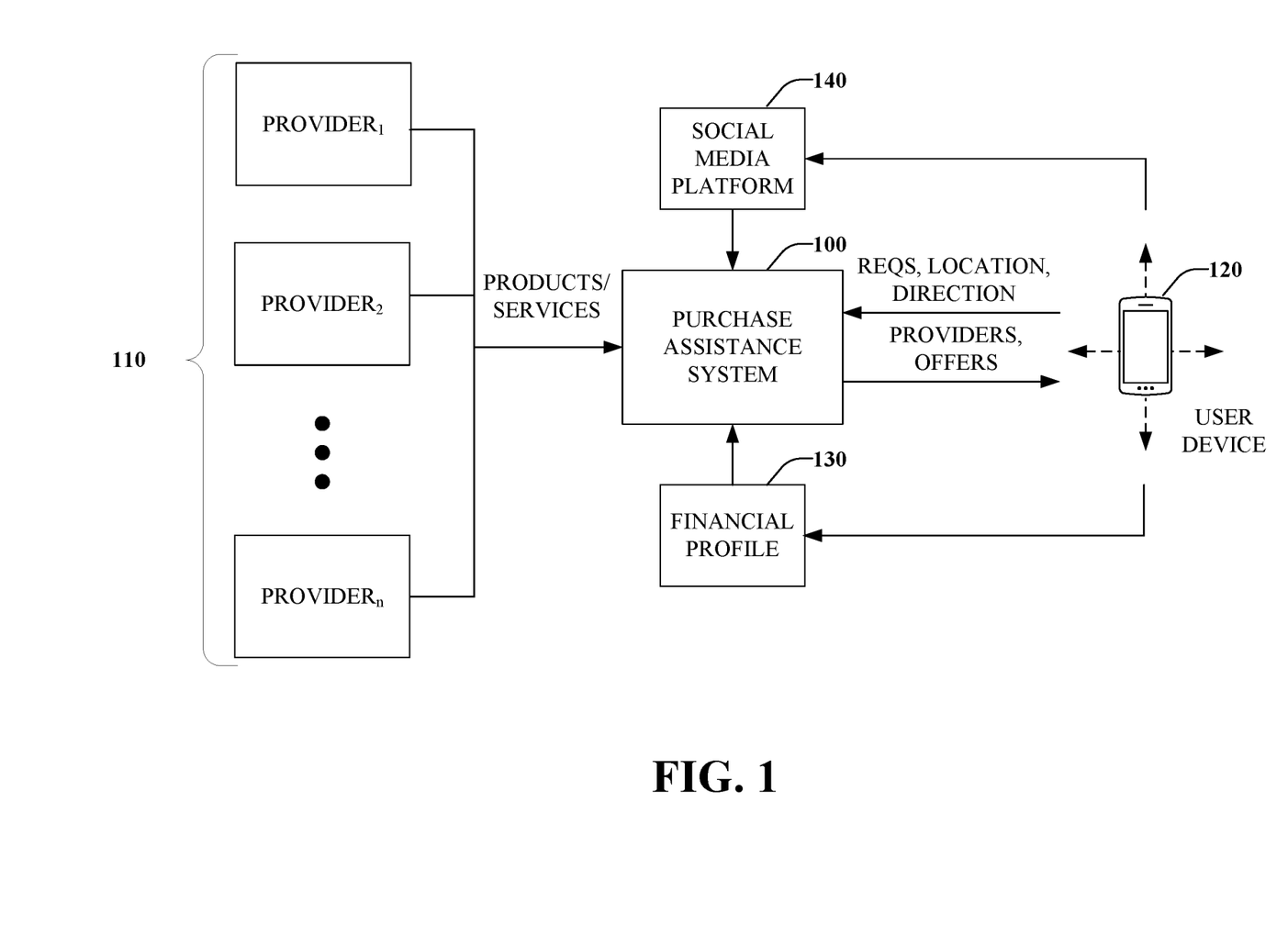
FIG. 1 illustrates an example implementation of aspects of the subject disclosure.

FIG. 1 depicts an overview of an example implementation of aspects of the subject disclosure described further herein. As shown, purchase assistance system 100 receives input from a plurality of providers 110 (PROVIDER$_1$-PROVIDER$_N$, where N is an integer greater than one) and outputs provider identity and optional offers associated with movement and other information received from user device 120. The providers 110, corresponding to entities or individuals offering goods or services for sale, can register with the purchase assistance system 100 and provide various information regarding at least availability of goods or services. For example, car dealerships can register with the system 100 and provide information about current vehicle inventory. A user of the user device 120 (e.g., mobile computing device, smart phone, tablet, wearable device, computer . . . ) may be interested in purchasing a product such as a car. The user device 120 can interact with the purchase assistance system 100 to facilitate such a purchase. In one instance, a user can specify requirements or filter conditions associated with a product of interest, such as make, model, year, and color of a car. In response, the purchase assistance system 100 can identify stores where the product is available and optionally offers or promotions. Moreover, the information can be sensitive to device direction. More particularly, the user device 120 can be aimed or pointed in a particular direction and providers and optional offers associated with that direction can be presented. For example, pointing the user device 120 north would result in presentation of car dealerships located in that direction that have a car of interest in inventory, while pointing the user device 120 south would result in a different set of car dealerships located in that direction.

The purchase assistance system 100 can also receive a financial profile 130 of a user of the user device 120. The financial profile 130 can include spending habits of the user, income and debt, for example, among other things. Based on the financial profile 130, the system 100 can generate promotions or offers. For instance, a promotional interest rate on a car loan when a car is purchased from a particular dealership can be available and presented in association with the dealership. In accordance with one embodiment, the purchase assistance system 100 can be operated by a financial institution, such as a bank, which can utilize purchase history as the financial profile and offer financial products, such as loans, to users based on a relationship with a provider 110 and financial profile 130 of a user. For instance, an individual may be offered a finance deal, if a vehicle is purchased from a particular dealership.

The purchase assistance system 100 can also employ data from one or more social media platforms 140. The one or more social media platforms 140 comprise forms of electronic communication in which users create online communities to share information, ideas, and other content (e.g., Facebook, Twitter, LinkedIn . . . ). The data can be collected and provided in conjunction with stores. For instance, social media reviews of providers or products can be made available.

By way of example, consider a user who desires to purchase a blue, 2019, mid-sized sport utility vehicle. The user can specify these restrictions on a user device 120, such as a smart phone, by way of an application installed on the device and associated with her bank. Specified restrictions can subsequently be communicated to the purchase assistance system 100 executing on a network connected server (e.g., cloud service). Next, the purchase assistance system 100 identifies providers 110, here dealerships, which have such a vehicle in their inventory. The purchase assistance system 100 can then utilize the financial profile 130 captured by her bank and relationships established between one or more dealerships to generate one or more financing offers. For instance, the financial profile 130 can capture credit worthiness upon which to base finance options. Further, the system 100 can collect data from social media regarding reviews of particular vehicles or dealerships. The system 100 can then communicate the dealerships, offers, and reviews back to the user device 120. In one instance, the user device 120 can filter and present the data based on a geographic location of the stores, the user's current location, and the direction the mobile computing device 120 is aimed. In another instance, at least a subset of the functionality, such as determining dealerships in a particular location or direction, can be performed by the purchase assistance system 100 and the results may be communicated to the user device 120. In either case, the user can explore dealerships, offers, reviews, and location to facilitate making a purchase decision.

Figure 2:
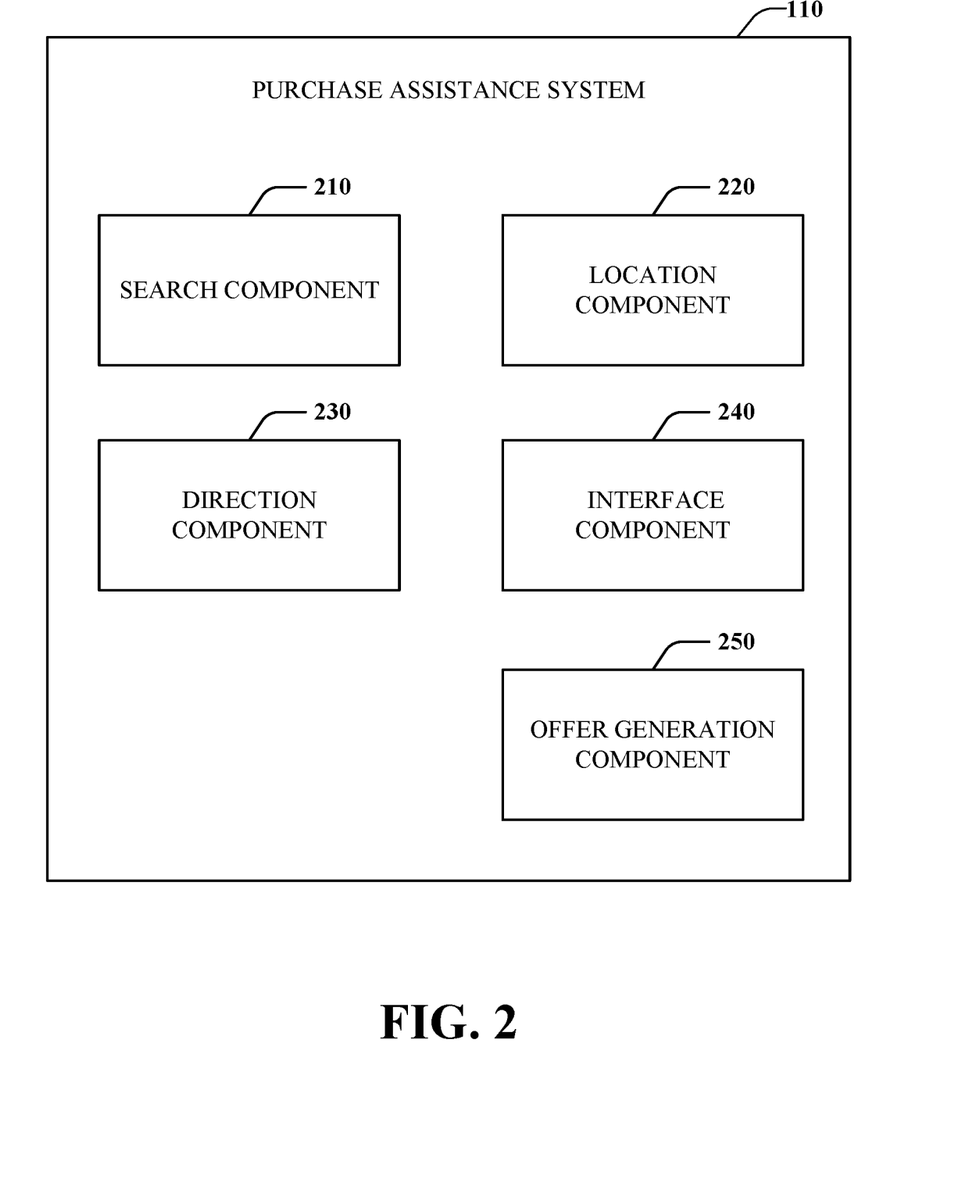
FIG. 2 illustrates an example component diagram of a system of the present innovation.

FIG. 2 illustrates the purchase assistance system 100 in further detail. The system 100 includes search component 210, location component 220, and direction component 230. The search component 210 is configured to identify providers and optionally offers in response to a request. Providers refer to entities that offer goods or services for sale. In accordance with one embodiment, providers can be associated with a physical location or distribution point and can include retailers, distributors, and private sellers, among others. The search component 210 can locate a provider, as well as offers, based on restrictions of filter conditions specified by a user. Further, the search component 210 can restrict, or filter searches based on a current user location and direction a computing device is facing.

The location component 220 determines a location of a user or, more particularly, a user device. In some embodiments, the location component 220 can utilize a GPS, Wi-Fi triangulation, and/or like methods to determine location using components of the user device. In one instance, a user device can perform such location functionality and provide the location to the system 100. In another instance, a user device can collect data and provide the information to the system 100, which can employ the location component 220 to identify the current user location.

The direction component 230 determines direction information of a user device. The direction component 230 determines direction information through one or more methods. In some embodiments, the direction component 230 uses a compass orientation to determine a direction (e.g. north, east, south, west, or degrees) or a bearing that the user device is facing or pointing. In other embodiments, the direction component 230 determines a direction vector of movement. The direction vector of movement indicates that a user is moving in a defined direction. The direction vector of movement can be determined using changing GPS coordinates, a predetermined navigation route, and/or like methods to detect movement in a direction.

In some embodiments, the direction component 230 can determine direction information using image recognition features and deep learning techniques. The direction component 230 can view an image or live video from a camera of the user device. The direction component 230 determines the direction the user device is pointed using an image recognition algorithm to recognize what is in the image. For example, the camera of the user device is pointed at a distinct building. The direction 230 can recognize the building and use deep learning to determine where the user is in relation to the distinct building and subsequently determine the direction from which the user is viewing the building.

In some embodiments, the direction component 230 determines a compass orientation and a direction vector of movement. The direction component 230 selectively prioritizes the direction information based on predetermined rules. For example, a compass orientation indicates the user device is pointed north while a direction vector of movement is pointed east. The direction component 230 can prioritize the compass orientation over the direction vector based on a rule that prioritizes the compass orientation. In another example, the direction component 230 can prioritize a weighted average between the compass orientation and the direction vector to determine a direction for a search.

The search component 210 can search based on location or direction provided by the location component 220 and the direction component 230 of the system 100. By way of example, location provided by the location component 220 can be employed to search for stores within a predetermined radius or proximity to the location. Further, the search component 210 can receive direction from a compass orientation provided by the direction component 230 and search for stores in that direction or within a predefined number of degrees from the specific direction. In another example, the search component 210 receives a direction vector of movement. The search component 210 can find providers close to the vector of movement.

The purchase assistance system 100 includes the interface component 240. In one embodiment, the interface component 240 can be an application programming interface (API) that facilitates interaction between the system 100 and a user device or more particularly an application on the user device. In this manner, processing and functionality can be split between the purchase assistance system 100 and the user device with communication facilitated by the interface 150. Alternatively, the interface 150 can be embodied as a user interface or a mechanism that generates interface elements that can be conveyed to a user device for display. In this manner, views can be generated that show results of a search based on restrictions as well as location or directions.

In some embodiments, the interface component 240 generates an augmented reality view. The augmented reality view dynamically changes according to changes in the direction information in real time or near real-time. For example, the view changes as the user points the user device 120 in different directions, pans over different directions, or moves in a different direction vector. The search component 210 can dynamically update providers as the direction information changes and the interface 150 continuously updates the augmented reality view with the updated results. The providers can be overlaid onto a camera view from the user device 120.

In some embodiments, the interface 150 can determine a device orientation of the user device 120. The device orientation can be a portrait orientation, a landscape orientation, and/or the like. The interface 150 changes the view according to the determined device orientation. For example, the interface 150 generates a multi-provider view when the determined orientation is a landscape orientation. The multi-provider view can be an augmented reality view showing any providers in the direction the user is pointing or moving. The interface 150 can generate a detailed offer view when the determined orientation is a portrait orientation. For example, a user can see a provider in landscape orientation view and change the device orientation to a portrait orientation. The interface 150 generates a detailed offer view to show more information of an offer of the product by the provider. The information can be product reviews, alternative providers, financing offers, and/or the like. In some embodiments, the interface 150 determines the device orientation using information from a gyroscope of the user device 120.

The purchase assistance system 100 also includes offer generation component 250. The offer generation component 250 is operable to automatically generate an offer for a user in response to a search for a desirable product or service for purchase. Information collected about a user in the form of a financial or other profile can be utilized as a basis for generation of a particular offer. Additionally, associations with particular providers can provide a basis for an offer. In one instance, an offer can correspond to financial products such as loans or credit with favorable terms to fund purchase of a searched product or service. By way of example, and not limitation, the offer generation component 250 can generate a finance offer (e.g., sixty days same as cash, zero percent interest for twenty-four months . . . ) that accounts for purchase and credit history of a user as well as any relationship with the provider.

Figure 3:
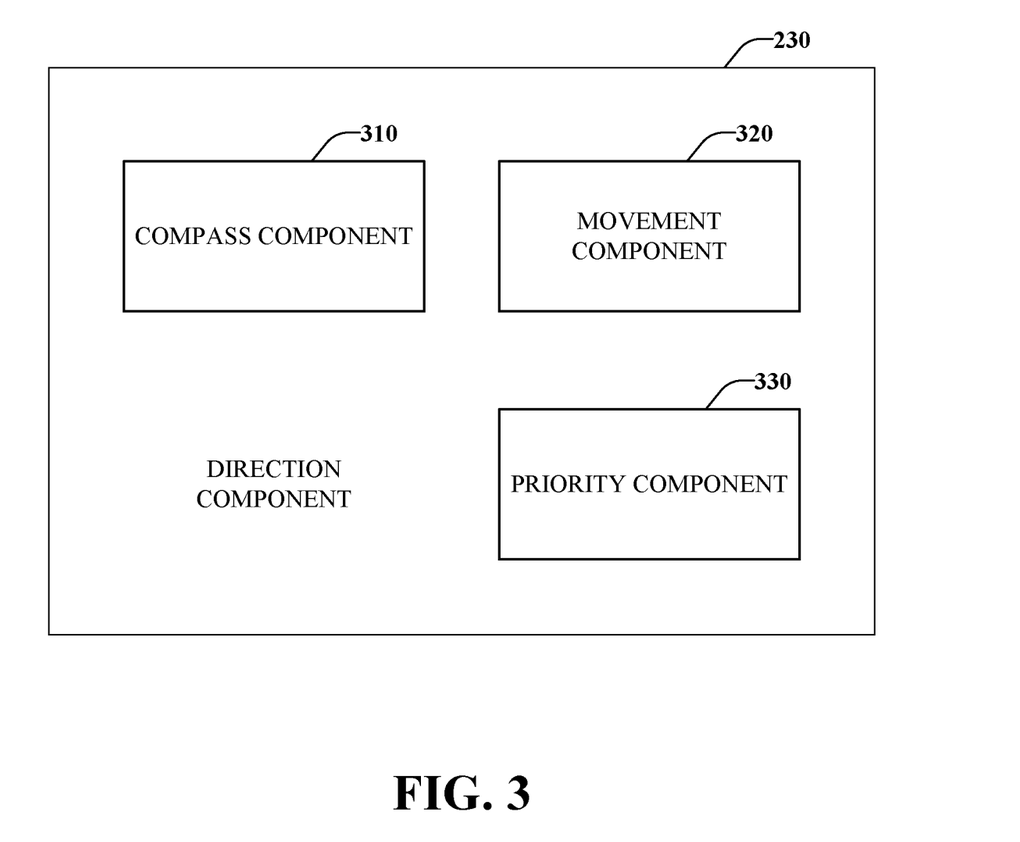
FIG. 3 illustrates an example component diagram of a direction component.

FIG. 3 illustrates a sample detailed component diagram of the direction component 230. The direction component 230 includes a compass component 310. The compass component 310 determines a compass orientation to determine a direction (e.g. north, east, south, west, or degrees) or bearing that the user device is facing or pointing. The compass component 310 can be a magnetic compass, digital compass, and/or another method of determining a direction.

The direction component 230 includes movement component 320. The movement component 320 determines a direction vector of movement. The direction vector of movement indicates that a user is moving in a defined direction. In some embodiments, the movement component 320 uses changing GPS coordinates of the user device to determine the direction vector of movement. In other embodiments, the movement component 320 uses velocity, vehicle data, navigation data, and/or the like to determine the direction vector of movement.

The direction component 230 includes a priority component 330. The priority component 330 selectively prioritizes the direction information based on predetermined rules. For example, a compass orientation indicates the user device is pointed north while a direction vector of movement is pointed east. The priority component 330 prioritizes the compass orientation over the direction vector based on a rule that prioritizes the compass orientation. In another example, the priority component 330 prioritizes a weighted average between the compass orientation and the direction vector to determine a direction for the search component 210.

Figure 4:
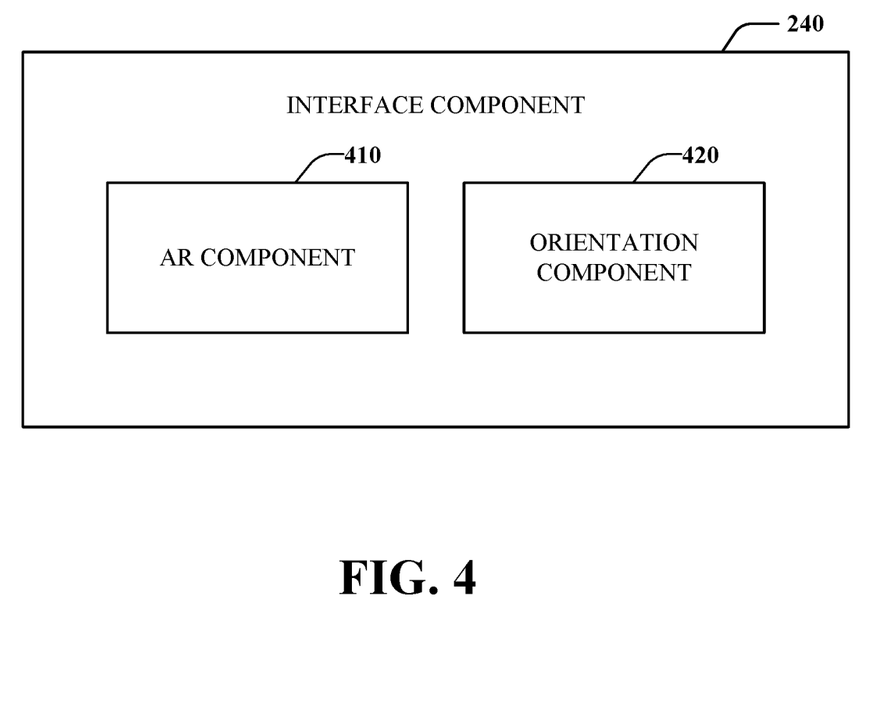
FIG. 4 illustrates an example component diagram of a user interface.

FIG. 4 illustrates an example component diagram of the interface component 240. The interface component 240 presents at least one provider based on the direction information and the provider search. The interface component 240 can include a display and/or other forms of relaying information to the user. In some embodiments, the interface component 240 is integrated into the user device. The interface component 240 can generate views to show the user the results of the provider search based on the direction information.

In some embodiments, the interface component 240 includes an augmented reality (AR) component 410. The AR component 410 generates an augmented reality view. The augmented reality view dynamically changes according to changes in the direction information in real time or near real-time. For example, the view changes as the user points a user device in different directions, pans over different directions, or moves in a different direction vector. The search component 210 can dynamically update providers as the direction information changes and the AR component 410 continuously updates the augmented reality view with the updated results. The providers can be overlaid onto a camera view from the user device.

In some embodiments, the interface component 240 includes an orientation component 420. The orientation component 420 determines a device orientation of the user device. The device orientation can be a portrait orientation, a landscape orientation, and/or the like. The interface component 240 and/or the AR component 410 changes the view according to the determined device orientation from the orientation component 420. For example, the AR component 410 generates a multi-provider view when the determined orientation is a landscape orientation. The multi-provider view can be an augmented reality view showing any providers in the direction the user is pointing or moving.

The AR component 410 generates a detailed offer view when the determined orientation is a portrait orientation. For example, a user can see a provider in landscape orientation view and change the device orientation to a portrait orientation. The AR component 410 generates a detailed offer view to show more information of an offer of the product by the provider. The information can be product reviews, alternative providers, financing offers, and/or the like. In some embodiments, the interface component 240 determines device orientation using information from a gyroscope of the orientation component 420.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but known by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Among other things, such components can automate certain mechanisms or processes performed thereby to make portions of the systems and methods more adaptive as well as efficient and intelligent. By way of example, and not limitation, such mechanisms can be utilized by the purchase assistance system 100 to identify products or services from images provided by a user or infer device direction from various factors.

Figure 5:
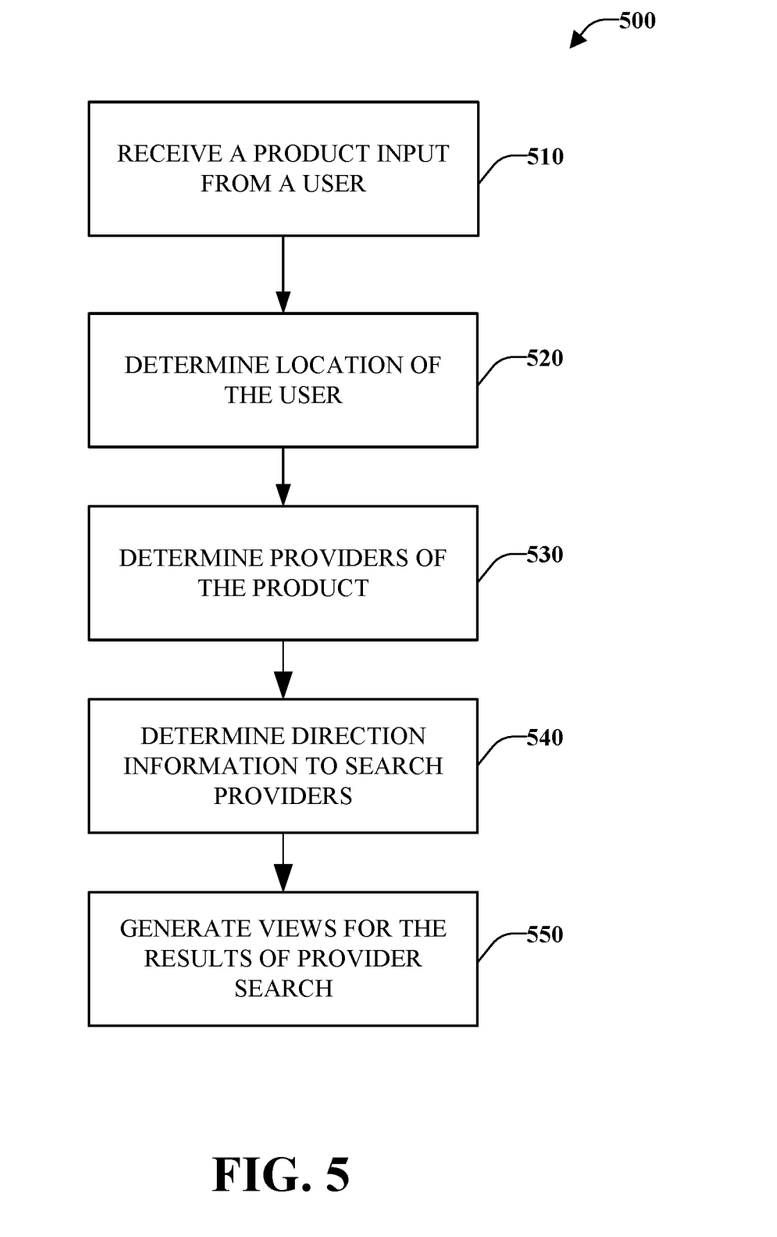
FIG. 5 illustrates a method of provider provisioning.
Figure 6:
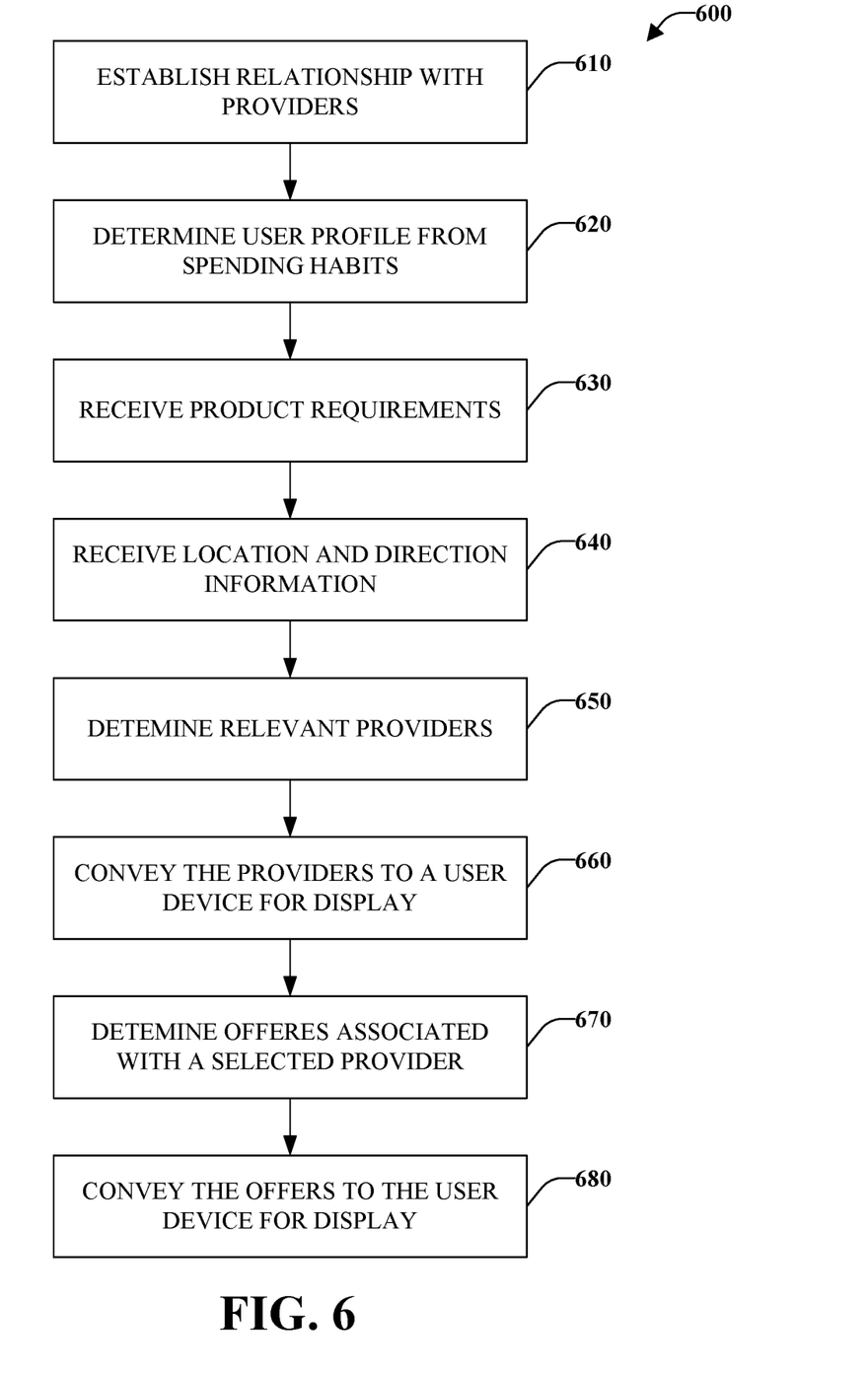
FIG. 6 illustrates a method for provider and offer identification.

In view of the exemplary systems described above, methods that may be implemented in accordance with the disclosed subject matter will be better appreciated with reference to flow chart diagrams of FIGS. 5 and 6. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

FIG. 5 illustrates a method 500 of provider provisioning that can be performed at least in part by purchase assistance system 100. At 510, a user input is received identifying a product or service the user desires to purchase, research, and/or the like. In user input can be text or an image from which a text description can be extracted, among other things. The user input may identify a product, identify a type of product, identify products in a location, or a combination thereof. Similarly, the user input may identify a service, a type of service, identify services in a location, or a combination thereof.

At 520, the location of the user is determined, or more specifically a location of a user device 120 is determined. The location can be determined using GPS, Wi-Fi triangulation, and/or the like to determine a search radius around the user. The location may be a latitude and longitude, an address, a township, a city, a county, a state, a province, a plot of land, or other geographic identification of a location. The location may be determined through an automated process of receiving signals from other sources such as cellular towers, Wi-Fi servers, radio signals, satellites, or the like. In one embodiment, the location may be determined by receiving an input from the user. In various embodiments, the location may be a virtual location in a virtual world.

At 530, a provider search is conducted to find all providers 110 that sell or distribute the product or service in the user input. The provider search can be limited to a predetermined radius. The provider search may limit providers 110 to the geographic location determined in 520. The provider search may determine providers 110 of a single product, a single service, a list of products, or a list of services. The provider search may determine providers 110 based on further limitations, including but not limited to, total sales, social media scores, reviews, and prior purchasing history of the user with the provider 110.

At 540, direction information is determined for the user. The direction information can be a compass direction or a direction vector of movement. The direction information narrows the provider search to the direction the user is facing, searching, or moving. The direction information may be determined by a compass, cameras, accelerometer, gyroscope, or combination thereof. The direction information may be determined by a path that the user is taking to travel to a location. Thus, the provider search may be limited to the path that the user is taking. The direction information may also be determined by manual input from the user.

At 550, a view is generated for the user displaying the results of the search. The view can be an augmented reality view where the results can be layered over a camera view from a user device 120. The augmented reality view can indicate providers 110 that are in the camera view from the user device 120. The augmented reality view may also display providers 110 that are out of the camera view of the user device 120. A distance from the user device 120 to the providers 110 that are not in the camera view may be indicated by a graphic. In one example, the graphic that indicates a distance to the providers 100 is an arrow, where the size of the arrow is based on the distance to the provider 110. The augmented reality view may also prioritize providers 110 based on preferences set by the user. In one example of prioritizing providers 110, the augmented reality view may highlight providers 110, that have a high priority, with bright colors. Likewise, the augmented reality view may highlight providers 110, that have a low priority, with dim colors. The augmented reality view may prioritize providers based on the financial profile 130 of the user. For example, the spending habits of the user, from the financial profile 130 of the user, may be leveraged by the purchase assistance system 100 to highlight the providers 110 that the user is most likely to engage.

FIG. 6 an example method 600 associated with providing purchase assistance. At least a portion of the method 600 can be implemented by the purchase assistance system 100. At 610, one or more relationships are established with providers 110 of products or services. Establishing a relationship can correspond to a provider 110 registering with a system, such as system 100, and communicating information about available products or services. In another example, a relationship with a provider 110 may be established by querying potential providers 110 through an automated process. A relationship is established with the providers 110 that respond affirmatively to the query. In one embodiment, a relationship is established by querying potential providers 110 in a location that the user device 120 is in.

At 620, a user profile, such as financial profile 130, can be determined based on spending habits, among other things. The spending habits of the user may be based on the types of products and services that the user has purchased. The spending habits of the user may also be based on the locations that the user has made purchases. The spending habits of the user may also be based on the financial purchasing ability of the user. The spending habits of the user may also include direction vectors that the user device 120 faced when purchases were made in the past.

At 630, product or service requirements are received. These requirements can indicate user desired features or characteristics of a product or service. The user may enter the product or service requirements based on the type of products or services that the user desires to receive. The user may enter a single product or service, or the user may enter a list of products and services. The user may enter a requirement, whereby the products and services are determined by the requirement. For example, the user may indicate that the user requires entertainment, whereby the purchase assistance system 100 may indicate products and services that are entertaining.

At 640, location and direction information are received for example from a user device 120. The location corresponds to a particular geographic location and direction indicates the direction a user device is aimed or facing. The user device 120 may receive the location of the user device 120 based on wireless signals from other devices. For example, a GPS satellite signal, which specifies the latitude, longitude, and altitude of the user device 120, may be received. In one embodiment, the user device 120 may receive the location of the user device 120 by the user manually entering the location of the user device 120. The direction information may be received from a device camera, compass, accelerometer, gyroscope, or combination thereof.

At 650, relevant providers 110 are determined. Relevant providers 110 can correspond to stores or distribution points that are within a predetermined radius of a user location and in a particular direction. The predetermined radius may be centered based on the location information received at 640. Similarly, the particular direction may be pointed in a direction based on the direction information received at 640. The relevant providers 110 may be determined based on the product requirements that were received at 630. The relevant providers 110 may also be determined by the social media platform 140. In one embodiment, social media reviews of providers 110 may be used exclusively or in combination with location and direction information to determine the relevant providers 110.

At numeral 660, the determined providers 110 are conveyed to a user device 120 for display. In accordance with one particular implementation, the providers can be transmitted to a particular application running on the user device 120. The application running on the user device 120 may display the determined providers in an augmented reality view. The augmented reality view may display the determined providers 110 as a layer over a camera view.

At 670, offers associated with a selected provider are determined. For instance, a user can select one of the displayed providers to seek further information. The offers can correspond to a promotion and can include financial products such as loans or lines of credit at rates based on the user profile. The offers may be prioritized based on the product requirements received at 640. The offers may be further prioritized based on the received location and direction information of the user device 120. The offers may be further prioritized based on a social media platform 140 score for the provider 110.

At 680, one or more determined offers are conveyed to the user device 120 for display. The offers may be incorporated into the augmented reality view of the user device 120. Offers from providers 110 may be layered in a camera view of the user device 120. The augmented reality view may display offers based on the direction that was received by the user device 120 at 640. Offers may be layered at the location and/or direction received by the user device 120. For example, an offer from a provider 110 may be displayed in an augmented reality layer at the location and direction of the provider 110 relative to the user device 120. Offers may be arranged in the augmented reality view based on the spending habits of the user. For example, offers from providers 110 may be highlighted in the augmented reality view based on previous purchases that have been made by the user.

Aspects of the subject disclosure pertain to the technical problem of provisioning purchase assistance in conjunction with a computing device. Technical features associated with addressing this problem include, among other things, determining a location and direction associated with a computing device for use in identifying providers, identifying or generating offers based on a user profile and provider association, and presenting providers and offers in an augmented reality view that dynamically changes based on direction of the computing device.

The subject disclosure provides for various products and processes that perform, or are configured to perform, purchase assistance based on device movement. What follows are one or more exemplary systems and methods.

A system comprises a processor coupled to a memory that includes instructions that when executed by the processor cause the processor to: receive user input identifying a product or service; determine a location and direction of a user device; identify one or more providers of the product or service within a predetermined proximity of the location of the user device and in the direction of the user device; and transmit, for display on the user device, the one or more providers. The instructions can further cause the processor to identify one or more offers associated with the product or service and transmit the offers with the one or more providers for display on the user device. The system can further generate a finance offer based on a user financial profile. Determining the direction comprises accessing a compass orientation of the user device or determining a direction vector of movement of the user device. The instructions further cause the processor to prioritize direction based on compass orientation and direction based on a vector of movement based on predetermined rules. The instructions further cause the processor to generate an augmented reality view that dynamically changes according to direction of the user device. The identify the one or more providers further comprises receiving the one or more providers from a network accessible service in response to a request based on the location and direction of the user device, wherein the one or more providers are requested and received by an application associated with the network accessible service on the user device.

A method comprises: receiving a user input identifying a product or service on a user device; determining a location of the user device; associating the product or service with one or more providers of the product or service in proximity to the location of the user device; determining direction information of the user device; and presenting at least one provider on the user device based on the direction information. The method further comprises determining the direction information based on a compass orientation of the user device or direction vector of movement of the user device. The method further comprises comprising selectively prioritizing the direction information based on predetermined rules. Further yet, the method comprises generating an augmented reality view, the augmented reality view dynamically changes according to the direction information, determining the device orientation further comprising determining a device orientation, the device orientation being one of portrait orientation or landscape orientation, and determining the augmented reality view based on the device orientation. Still further yet, the method comprises comprising generating a multi-provider view for the augmented reality view, wherein the determined orientation is a landscape orientation, and generating a detailed offer view for the augmented reality view, wherein the determined orientation is a portrait orientation, and wherein the detailed offer view includes one of a product review, alternative providers, or financing offers.

Another method comprises: executing, on a processor, instructions that cause the processor to perform operations comprising: receiving user input identifying a product or service; determining one or more providers associated with the product or service based on location and direction of a user device; determining one or more finance offers associated with the product or service; and conveying, for display on the user device, the one or more providers and finance offers associated with the product or service. The method also comprises receiving, in response to a request, the one or more providers and one or more finance offers from a network accessible service associated with a user device application.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 7:
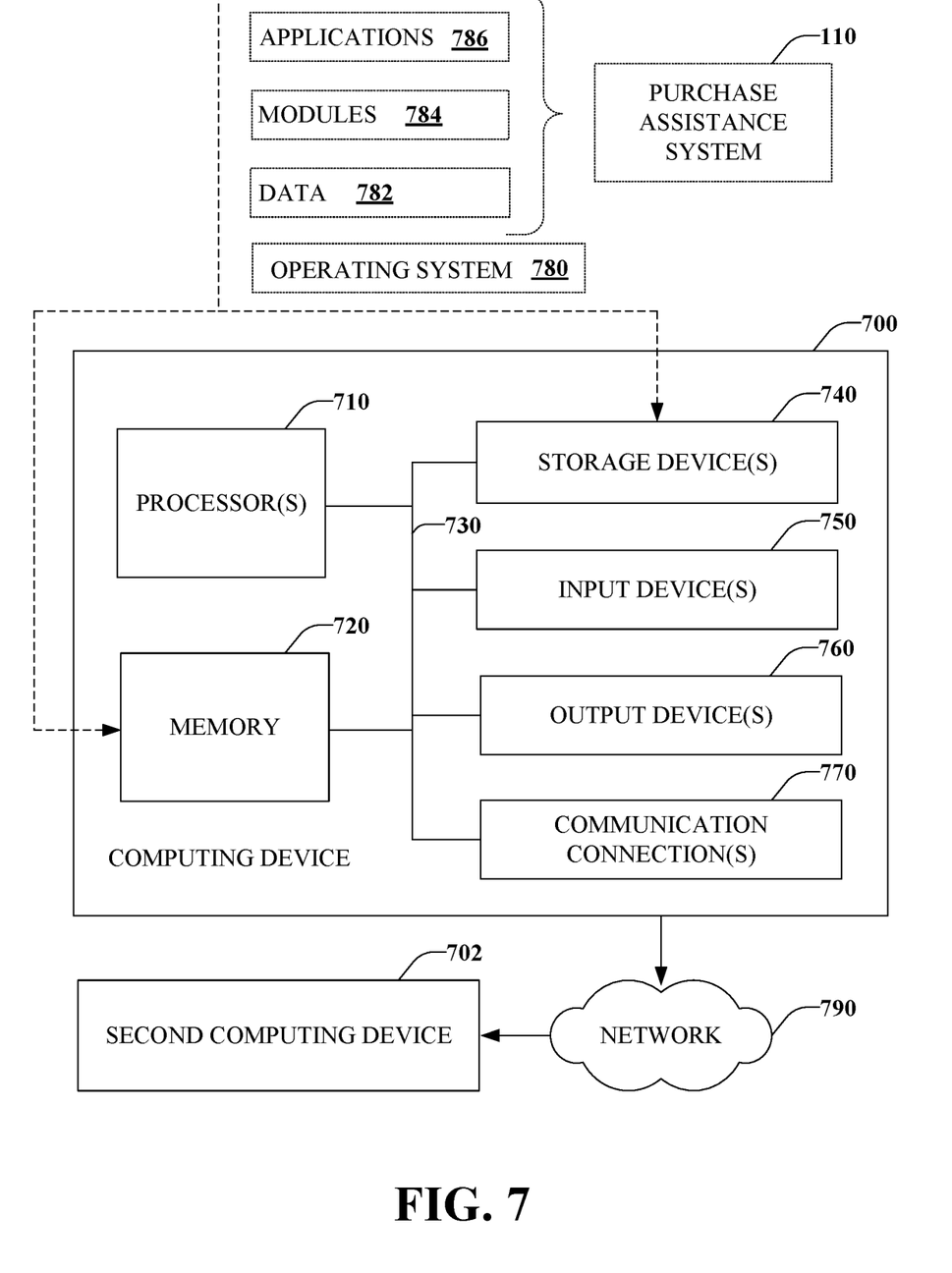
FIG. 7 illustrates a computing environment where one or more of the provisions set forth herein can be implemented, according to some embodiments.

To provide a context for the disclosed subject matter, FIG. 7 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 7, illustrated is an example computing device 700 (e.g., desktop, laptop, tablet, watch, server, hand-held, programmable consumer or industrial electronics, set-top box, game system, compute node . . . ). The computing device 700 includes one or more processor(s) 710, memory 720, system bus 730, storage device(s) 740, input device(s) 750, output device(s) 760, and communications connection(s) 770. The system bus 730 communicatively couples at least the above system constituents. However, the computing device 700, in its simplest form, can include one or more processors 710 coupled to memory 720, wherein the one or more processors 710 execute various computer executable actions, instructions, and or components stored in the memory 720.

The processor(s) 710 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 710 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 710 can be a graphics processor unit (GPU) that performs calculations with respect to digital image processing and computer graphics.

The computing device 700 can include or otherwise interact with a variety of computer-readable media to facilitate control of the computing device to implement one or more aspects of the disclosed subject matter. The computer-readable media can be any available media that accessible to the computing device 700 and includes volatile and non-volatile media, and removable and non-removable media. Computer-readable media can comprise two distinct and mutually exclusive types, namely storage media and communication media.

Storage media includes volatile and nonvolatile, removable, and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 700. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 720 and storage device(s) 740 are examples of computer-readable storage media. Depending on the configuration and type of computing device, the memory 720 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 700, such as during start-up, can be stored in nonvolatile memory, while volatile memory can act as external cache memory to facilitate processing by the processor(s) 710, among other things.

The storage device(s) 740 include removable/non-removable, volatile/non-volatile storage media for storage of vast amounts of data relative to the memory 720. For example, storage device(s) 740 include, but are not limited to, one or more devices such as a magnetic or optical disk drive, floppy disk drive, flash memory, solid-state drive, or memory stick.

Memory 820 and storage device(s) 740 can include, or have stored therein, operating system 780, one or more applications 786, one or more program modules 784, and data 782. The operating system 780 acts to control and allocate resources of the computing device 700. Applications 786 include one or both of system and application software and can exploit management of resources by the operating system 780 through program modules 784 and data 782 stored in the memory 720 and/or storage device(s) 740 to perform one or more actions. Accordingly, applications 786 can turn a general-purpose computer 700 into a specialized machine in accordance with the logic provided thereby.

All or portions of the disclosed subject matter can be implemented using standard programming and/or engineering techniques to produce software, firmware, hardware, or any combination thereof to control the computing device 700 to realize the disclosed functionality. By way of example and not limitation, all or portions of the purchase assistance system 100 can be, or form part of, the application 786, and include one or more modules 784 and data 782 stored in memory and/or storage device(s) 740 whose functionality can be realized when executed by one or more processor(s) 710.

In accordance with one particular embodiment, the processor(s) 710 can correspond to a system on a chip (SOC) or like architecture including, or in other words integrating, both hardware and software on a single integrated circuit substrate. Here, the processor(s) 710 can include one or more processors as well as memory at least similar to the processor(s) 710 and memory 720, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the purchase assistance system 100 and/or functionality associated therewith can be embedded within hardware in a SOC architecture.

The input device(s) 750 and output device(s) 760 can be communicatively coupled to the computing device 700. By way of example, the input device(s) 750 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 760, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 750 and output device(s) 760 can be connected to the computing device 700 by way of wired connection (e.g., bus), wireless connection (e.g., Wi-Fi, Bluetooth . . . ), or a combination thereof.

The computing device 700 can also include communication connection(s) 770 to enable communication with at least a second computing device 702 by means of a network 790. The communication connection(s) 770 can include wired or wireless communication mechanisms to support network communication. The network 790 can correspond to a local area network (LAN) or a wide area network (WAN) such as the Internet. The second computing device 702 can be another processor-based device with which the computing device 700 can interact. For example, the computing device 700 can correspond to a server that executes functionality of purchase assistance system 100, and the second computing device 702 can be a user device that communications and interacts with the computing device 700.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
a processor coupled to a memory that includes instructions that when executed by the processor cause the processor to:
receive user input identifying a product or service;
determine a location and direction of a user device, wherein direction of the user device is the direction in which the user device is pointed;
identify one or more providers of the product or service within a predetermined proximity of the location of the user device and based on the direction the user device is pointing, wherein identifying the one or more providers based on direction comprises:
prioritize direction information such that one of a first direction based on compass orientation or a second direction based on a vector of movement is prioritized based on predetermined rules;
generate and display an augmented reality view that dynamically changes in real time according to direction of the user device; and
transmit, for display on the user device, the one or more providers in the augmented reality view, wherein the one or more providers dynamically update in real time on the augmented reality view if the direction of the user device changes.

2. The system of claim 1, the instructions further cause the processor to identify one or more offers associated with the product or service and transmit the offers with the one or more providers for display on the user device.

3. The system of claim 2, the instructions further cause the processor to generate a finance offer based on a user financial profile.

4. The system of claim 1, wherein determine the direction comprises accessing a compass orientation of the user device.

5. The system of claim 1, wherein determine the direction comprises determining a direction vector of movement of the user device.

6. The system of claim 1, wherein identify the one or more providers further comprises receiving the one or more providers from a network accessible service in response to a request based on the location and direction of the user device.

7. The system of claim 6, wherein the one or more providers are requested and received by an application associated with the network accessible service on the user device.

8. A method, comprising:
receiving a user input identifying a product or service on a user device;
determining a location of the user device;
associating the product or service with one or more providers of the product or service in proximity to the location of the user device;
determining direction information of the user device, wherein direction of the user device is the direction in which the user device is pointed;
identifying a subset of the one or more providers of the product or service within the proximity of the location of the user device based on the direction the user device is pointing, wherein identifying the one or more providers based on direction comprises:
prioritizing direction information such that one of a first direction based on compass direction or a second direction based on a vector of movement is prioritized based on predetermined rules;
generating and displaying an augmented reality view that dynamically changes in real time according to direction of the user device; and
presenting the subset of the one or more providers in the augmented reality view on the user device based on the direction information.

9. The method of claim 8, further comprising determining the direction information based on a compass orientation of the user device.

10. The method of claim 8, further comprising determining the direction information based on a direction vector of movement of the user device.

11. The method of claim 8, further comprising:
determining a device orientation, the device orientation being one of portrait orientation or landscape orientation.

12. The method of claim 11, further comprising determining the augmented reality view based on the device orientation.

13. The method of claim 12, further comprising generating a multi-provider view for the augmented reality view, wherein the determined device orientation is a landscape orientation.

14. The method of claim 12, further comprising generating a detailed offer view for the augmented reality view, wherein the determined device orientation is a portrait orientation, and wherein the detailed offer view includes one of a product review, alternative providers, or financing offers.

15. A method, comprising:
executing, on a processor, instructions that cause the processor to perform operations comprising:
receiving user input identifying a product or service;
determining one or more providers associated with the product or service based on location and direction of a user device, wherein direction of the user device is the direction in which the user device is pointed;
determining one or more finance offers associated with the product or service wherein the finance offers are based on the direction in which the user device is pointing, wherein the determining the one or more providers and finance offers based on direction comprises:
prioritizing direction information such that one of a first direction based on compass orientation or a second direction based on a vector of movement is prioritized based on predetermined rules;
generating and displaying an augmented reality view that dynamically changes in real time according to direction of the user device; and
conveying, for display on the user device, the one or more providers and finance offers associated with the product or service within the augmented reality view.

16. The method of claim 15, further comprising receiving, in response to a request, the one or more providers and one or more finance offers from a network accessible service associated with a user device application.

* * * * *